(12) United States Patent
Kanke et al.

(10) Patent No.: US 6,397,673 B1
(45) Date of Patent: Jun. 4, 2002

(54) AIR FLOW MEASURING APPARATUS

(75) Inventors: Atsushi Kanke, Hitachi; Kenji Ohta, Hitachinaka; Yasuo Makie, Mito, all of (JP)

(73) Assignees: Hitachi, Ltd., Tokyo; Hitachi Car Engineering Co., Ltd., Ibaraki, both of (JP)

( * ) Notice: Subject to any disclaimer, the term of this patent is extended or adjusted under 35 U.S.C. 154(b) by 0 days.

(21) Appl. No.: 09/306,294

(22) Filed: May 6, 1999

(30) Foreign Application Priority Data

May 6, 1998 (JP) ............................. 10-123513

(51) Int. Cl.[7] ................................. G01F 1/68
(52) U.S. Cl. ................................. 73/204.11
(58) Field of Search ............... 73/204.11, 861.356, 73/95, 861.25, 861.28, 702, 204.12, 204.14

(56) References Cited

U.S. PATENT DOCUMENTS 4,545,244 A * 10/1985 Yusuda et al. .............. 73/195
5,220,836 A * 6/1993 Harms et al. ............... 73/702
6,073,495 A * 6/2000 Stadler .................. 73/861.356

FOREIGN PATENT DOCUMENTS

| JP | 59-17371 | 4/1984 |
| JP | 62-821 | 1/1987 |
| JP | 6-265565 | 9/1994 |
| JP | 8-94406 | 4/1996 |
| JP | 9-88711 | 3/1997 |

* cited by examiner

Primary Examiner—Benjamin R. Fuller
Assistant Examiner—Jewel Thompson
(74) Attorney, Agent, or Firm—Crowell & Moring, LLP

(57) ABSTRACT

An air flow measuring apparatus, is of a type converting digital values Vadc having a non-linearity characteristic to a flow rate in air flow rate conversion processing. The apparatus, is provided with voltage output conversion processing, uses a QV map formed on a PROM, and is formed so as to obtain a voltage output signal Vout having a property equivalent to a signal Vin outputted from a sensor circuit by converting a smoothed signal Qaf into a voltage value having a non-linearity characteristic.

22 Claims, 6 Drawing Sheets

VOLTAGE-FLOW RATE CONVERSION MAP

FLOW RATE-VOLTAGE CONVERSION MAP

FLOW RATE-FLOW RATE CONVERSION MAP

AIR FLOW MEASURING APPARATUS

BACKGROUND OF THE INVENTION

The present invention relates to an apparatus for measuring air flow rates and, more particularly, to an air flow measuring apparatus suitable for metering intake air flow rates of an internal combustion engine for a vehicle.

There is a heat generating resistance type air flow measuring apparatus which is a kind of air flow measuring apparatus. The air flow measuring apparatus has a specific property by which it is possible to directly meter mass flow rates of a fluid to be metered and has been widely used as an intake air flow measuring apparatus for an internal combustion engine.

In general internal combustion engines, for example in an engine in which the number of cylinders is 4 or less, when the engine runs into an operational condition of a low engine speed and a high load, a pulsation amplitude of an intake air flow becomes large, and in some cases the intake air flow becomes pulsation flow accompanied by a partial backward flow. As a result, a conventional flow meter has a lowered measurement precision. Therefore, a correction method therefor is proposed in, for example.

Further, as a method of correcting errors caused by such an intake backward flow, for example, JP A 59-17371 proposes a correction method without detecting a direction of an air flow. According to this method, an alternating flow component of the air flow is detected, and correction is applied to the whole of the wave, whereby the error is nullified.

Further, for example, JP A 9-88711 proposes a correction means by software in which an air flow rate is detected as voltage and linearized (unit conversion). Then, advance-processing is effected to thereby detect a backward flow condition and correct an error.

On the other hand, JP A 6-265565, for example, proposes a construction in which a flow sensor is used as a flow speed meter. The output from the sensor is converted into digital values by an A/D convertor, and the characteristics are adjusted by a functional equation of a memory having prescribed factors recorded and displayed on a display. Alternatively, a construction is proposed in which the output is converted into analogue values by a D/A convertor (digital analogue convertor) and outputted as voltage.

Further, for example, JP A 8-94406 proposes a method of reducing an influence of flow rate fluctuation due to pressure fluctuation, using a construction similiar to the above. According to the method, after the output from the flow sensor is converted into digital values by an A/D convertor, they are linearized, and then an average value thereof is calculated, whereby a flow rate without errors can be displayed.

Further, each prior art system has a system construction which is closed as a flow meter.

The above-mentioned prior art systems do not take into sufficient consideration the case where a backward flow occurs in the air flow to be metered, so that a problem is left in measurement precision.

Here, backward flow means an air flow in the opposite direction to an intake air flow in the intake air duct of an internal combustion engine, and the backward flow is caused for the following reasons:

In general internal combustion engines, valve opening time overlaps between an intake valve and an exhaust valve and, as a result, an air flow flowing backward from the exhaust valve side to the intake valve side takes place in the overlapping time period, whereby the air flow in the opposite direction occurs in the intake duct.

A kind of flow meter, for example, a general heat generating resistance type air flow measuring apparatus, has the property of outputting a positive signal corresponding to an absolute value of a flow speed, irrespective of the direction of flow of a fluid to be metered.

Therefore, when such a flow meter meters an air flow rate including a backward flow, as a result, a flow rate which has a flow rate of the backward flow added to a flow rate of an air flow in the direction to be metered, that is, a normal flow rate, is output as a metered value.

In this case, since the backward flow also is detected and outputted as the normal flow rate, a signal of larger flow rate than a true average air flow rate is outputted. A measuring error thereby reaches 30–100% and measurement precision can not be maintained.

Next, in the heat generating resistance type air flow measuring apparatus, an air flow rate Q is expressed by the following equation (1) known as King's equation:

$$Ih^2 \cdot Rh = (C_1 + C_2 \cdot \sqrt{Q}) \cdot (Th - Ta) \qquad (1)$$

where $Ih$ is a current value of a heat generating resistor, $Rh$ is a resistance value of the heat generating resistor, $Th$ is a surface temperature of the heat generating resistor, $Ta$ is a temperature of air, $Q$ is an air flow rate and $C_1$ and $C_2$ are constants determined by the specification of the heat generating resistor.

As for output of measurement of a flow rate, it is general to detect current flow $Ih$ of the heat generating resistor by converting the current into voltage value V by voltage drop of the resistor. In an engine control unit, the voltage value V is converted into a flow rate Q from the equation (1) for engine control.

Here, for a probe (a detecting portion) of a heat generating resistance used for measuring an intake air flow rate of a vehicle, it is necessary to use a thick wire to some extent in order to secure reliability when a resistance wire is used for the probe, for example. As a result it can not be avoided for the probe to have heat capacity to some degree.

In this case, delay in response to dynamic flow variations such as pulsations takes place, and when pulsations appear in an engine intake air flow, precise pulsation waves can not be measured, so that there is a problem that errors are apt to be contained in the measurement.

Further, in vehicles, when sensor signals are sent to a control unit for controlling an internal combustion engine, in view of noises from other devices and apparatus, it is considered preferable from a viewpoint of S/N (a ratio of signal to noise) to take interface with signals which have a non-linear characteristic to flow rates without converting them so as to be linear.

Therefore, it is necessary to enable an air flow measuring section to detect an air flow rate with a high response using a heat generating resistance probe of a small heat capacity such as a semi-conductor probe and, in the engine control unit side, to effect high speed sampling of signals inputted from the air flow measuring section.

However, it is general for usual engine control units not to be provided with such a high processing ability and, therefore, it is difficult to cope with such a high response and there is a problem that measurement precision is lowered by delay in sampling.

SUMMARY OF THE INVENTION

An object of the present invention is to provide an air flow measuring apparatus (or air flow measuring device) which has a little limit to sampling cycles and in which the measurement precision lowering due to air flow pulsations and noises is sufficiently suppressed.

The above-mentioned object is achieved by a heat generating resistance type air flow measuring apparatus for measuring air flow rates using a heat generating resistor arranged in an air flow passage, which air flow measuring apparatus comprises a first converting means for converting voltage values detected by the heat generating resistor into flow rate values by a first conversion equation (first calculation equation) defined in advance, a filtering means for smoothing output from the first converting means, and a second converting means for converting output from the filter means into voltage values corresponding to the flow rate values by a second conversion equation (second calculation equation) defined in advance, wherein output of the second converting means is taken out as flow rate detection signals.

A means can be provided for recovering the response of a sensor by voltage value before converting into flow rates the voltage signals of the sensor which detected air flow rates.

Further, a means can be provided for switching a plurality of processing means for smoothing, according to pulsation characteristics of air flow rates.

Even if air flow pulsates, measurement precision of an average air flow rate can be raised without losing the signal detection characteristics inherently provided in the sensor.

DESCRIPTION OF EMBODIMENTS OF THE INVENTION

Figure 1:
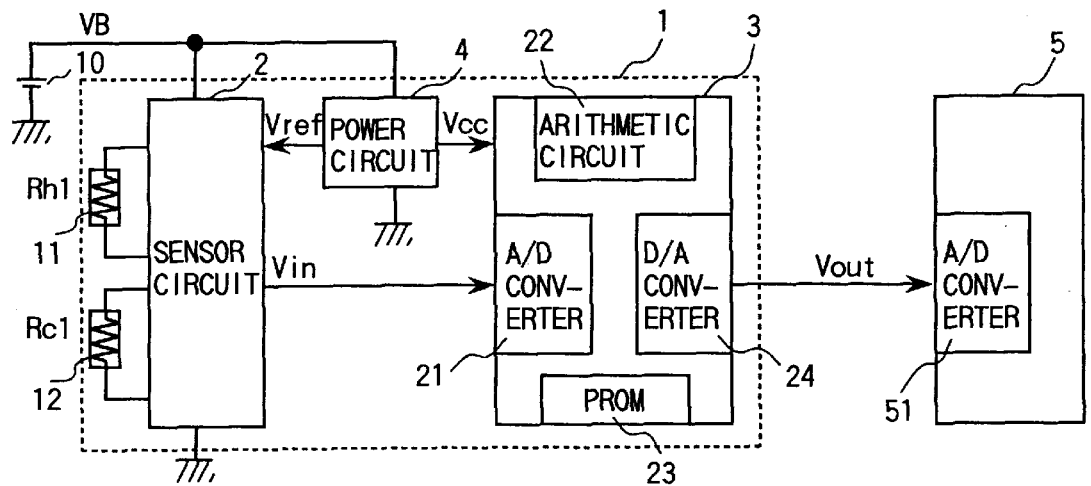
FIG. 1 is a block diagram of a first embodiment of an air flow measuring apparatus according to the present invention.

Embodiments of an air flow measuring apparatus according to the present invention will be described hereunder in detail, referring to the drawings.

FIG. 1 shows a heat generating resistance type air flow measuring apparatus 1 of a first embodiment of the present invention. As shown in FIG. 1, the air flow measuring apparatus 1 is composed of a sensor circuit 2, a micro-processor 3 and a power circuit 4, and composed so that measurement results are supplied as output signals Vout to a control unit 5 for controlling an engine.

The sensor circuit 2 composes a sensing section of the air flow measuring apparatus 1 and is provided with a heat generating resistor 11 installed in a passage for air to be metered of flow rate such as an intake duct of an internal combustion engine, and a temperature compensating resistor 12.

The heat generating resistor 11 is supplied with current from a power supply 10 such as a battery to be heated to a certain constant temperature. Since a quantity of heat received by the air from the heat generating resistor 11 changes according to air flow rates, a change in current value, generated to cancel a change caused in resistance value of the heat generating resistor 11 by air flow change, generates analogue output signals Vin representative of air flow rates Q.

The micro-processor 3 is for executing various kinds of processing necessary to process the output signals Vin, inputs the output signals Vin of the sensor circuit 2, converts them into digital values by an analogue digital converter (A/D convertor) 21, corrects errors using correction data prepared on a programmable memory (PROM) 23, converts them into analogue output signals Vout having voltage values equivalent to the output signals Vin of the sensor circuit 2 by a digital analogue converter (D/A converter) 24 and then outputs them to the engine control unit 5.

The power circuit 4 is supplied with electric power from the power supply 10 and generates a reference voltage Vref necessary for the sensor circuit 2 and an operation voltage Vcc required by the micro-processor 3.

Figure 2:
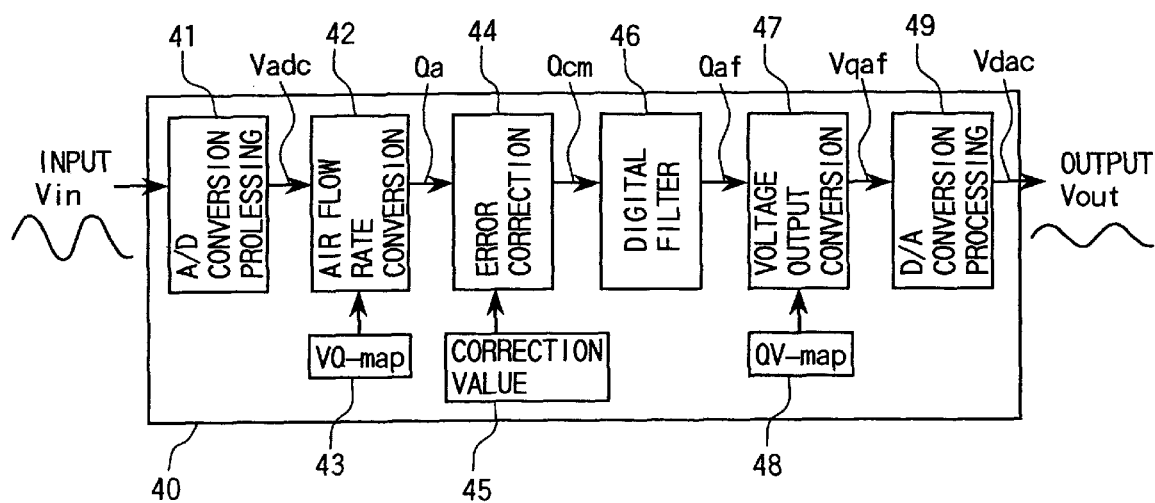
FIG. 2 is a diagram for explanation of processing in the first embodiment.

FIG. 2 shows processing 40 for error correction by the micro-processor 3, and the error correction processing according to the present embodiment is explained, referring to FIG. 2.

Upon execution of the processing 40, first of all, in the A/D converter 41, output signals Vin of the sensor circuit 2 are converted into digital values Vadc of the prescribed number of bits. Next, in the air flow rate conversion processing 42, the digital values Vadc having a non-linear characteristic to flow rates are converted into air flow rates Qa, using a VQ-map 43 formed on the PROM 23 (FIG. 1). Here, the VQ-map 43 is a voltage-flow rate map (defined as a first conversion equation (calculation equation)) formed based on output characteristics of a reference sensor, for example.

Next, in the error correction processing 44, various kinds of error correction necessary for air flow rates Qa is effected using correction values 45 on the rewriting memory 23, and corrected flow rate signals Qcm are output. As errors to be corrected, for example, there are errors caused from difference between the voltage-flow rate map (first conversion equation) and characteristics of individual sensors, errors due to backward flow, etc.

The backward flow errors also can be detected by feature extraction of pulsation waves of the input air flow rates Qa. However, in order to acknowledge the features of the wave form, it is necessary to effect A/D conversion at a sufficiently higher speed (frequency) than the pulsation frequencies. For example, when a variation range of the pulsation frequency is about several 10 Hz to 100 Hz, it is necessary for the A/D conversion processing 41 to effect high speed analogue-digital conversion processing which is able to process in about 1 ms.

Further, in the digital filter processing 46, in order to reduce non-continuity of pulsation waves due to error correction and pulsation amplitude characteristic, smoothing processing is carried out on the flow rate signals Qcm corrected of errors to obtain smoothed signals Qaf.

The voltage output conversion processing 47 converts the smoothed signals Qaf into a voltage value Vqaf with non-linear characteristic, using a QV-map 48 formed on the PROM 23 in a similar manner. Here, the QV-map is defined as a flow rate-voltage conversion map (a second conversion equation (second calculation equation)) formed, for example, on the basis of the output characteristics of the reference sensor.

Finally, the voltage value Vqaf having a non-linearity characteristic is converted to analogue values by the D/A conversion processing 49, to thereby obtain voltage output signals equivalent to the signals Vin outputted from the sensor circuit 2.

Here, as in this embodiment, in the case where it is formed so as to get voltage output signals Vout equivalent to the output signal Vin of the sensor circuit 2, the smoothing by the digital filter processing is very effective also for reducing errors by non-linearity of the sensor output.

Next, the improvement of the error non-linearity characteristic of the sensor output, obtained by using the first and second equations as map conversion will be explained, referring to FIGS. 3(1) and 3(2).

Figure 3:
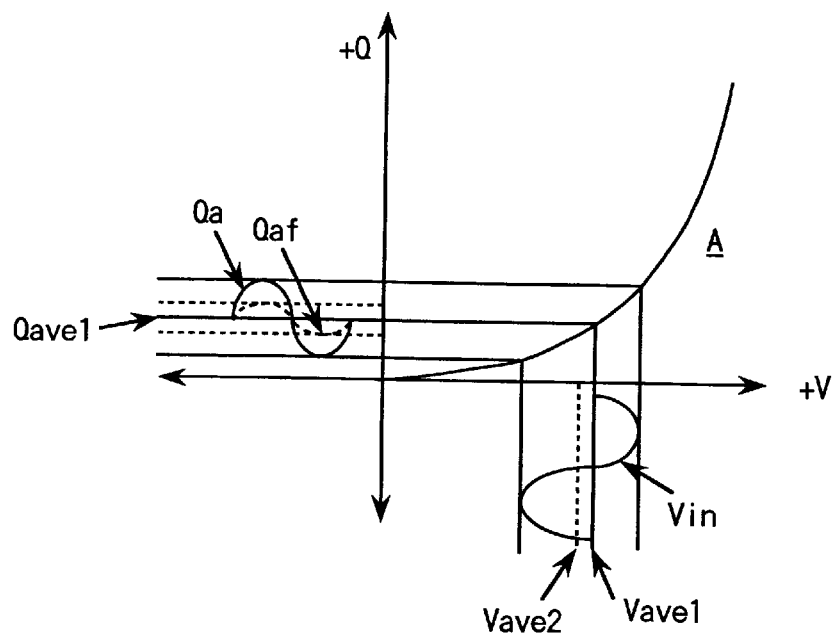
FIGS. 3(1) and 3(2) each are a characteristic diagram for explanation of an operation principle of a conversion map in the first embodiment of the present invention.
Figure 3:
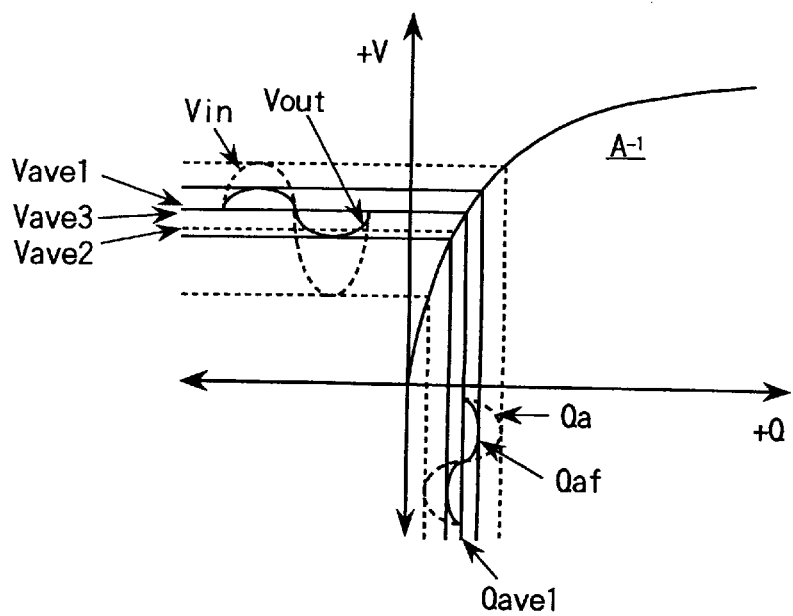

First of all, FIG. 3(1) shows the case wherein a characteristic A is provided as a voltage-flow rate conversion map, using a relation of flow rates to voltage output as the first conversion equation.

Now, assuming that when air flow rates pulsate, the pulsations represent an ideal sine wave, the sensor output signal Vin has such a wave shape that sine voltage is compressed at a plus side as shown in FIG. 3(1).

Therefore, those sensor output signals Vin are converted to air flow rates Qa by the voltage-flow rate conversion map having the characteristic A as shown in FIG. 3(1), whereby they are corrected to the original ideal sine wave and the center of the sine wave becomes an average Qave1.

However, at this time, a deviation between the voltage average Vave1 corresponding to an average Qave1 of this air flow rate Qa and the voltage average Vave2 of the sensor output signals Vin occurs as shown in FIG. 3(1), and the deviation becomes an error due to non-linearity of the sensor output.

Next, FIG. 3(2) shows the case where a relation of voltage output to the flow rate input is used as the second conversion equation, and a characteristic $A^{-1}$ which is a characteristic inverse to the characteristic A is provided.

Here, first of all, assuming that an air flow rate before smoothing is Qa shown by a dotted line and the amplitude of the air flow rate Qaf after smoothing can be reduced as it is as an ideal sine wave, average values of both the waves are equal to each other and must be an average Qave1.

Next, in the case where it is converted to voltage by the second conversion equation, that is, the map having the characteristic $A^{-1}$ as shown in FIG. 3(2), the voltage output Vout corresponding to the air flow rate Qaf after smoothing is greatly reduced in voltage amplitude, so that it is found that the voltage value Vave1 of the average value of air flow rates is approximately equal to an average value Vave3 as pulsation voltage.

Therefore, in comparison with an average voltage value Vave2 of voltage value Vin shown by a broken line, which is obtained by conversion using the map having the characteristic $A^{-1}$ corresponding to ideal sine wave air flow rates Qa, an error can be greatly reduced.

In this embodiment, the second conversion equation is made so as to be a characteristic inverse to the first conversion equation, those are related to be the same relation equations in principle, so that there is an advantage that it is unnecessary to care about difference in sensor characteristic due to map conversion on appearance.

Further in this embodiment, since the air flow measuring apparatus 1, when viewed from the engine control unit 5, can be treated the same as the case where output voltage signals Vin are directly taken in from the sensor circuit 4 as is conventional, and since variations in amplitude due to pulsations have been reduced, the system has merit in that it is unnecessary to make the sampling frequencies of the A/D convertor 51 higher the side of the engine control unit 5.

Figure 4:
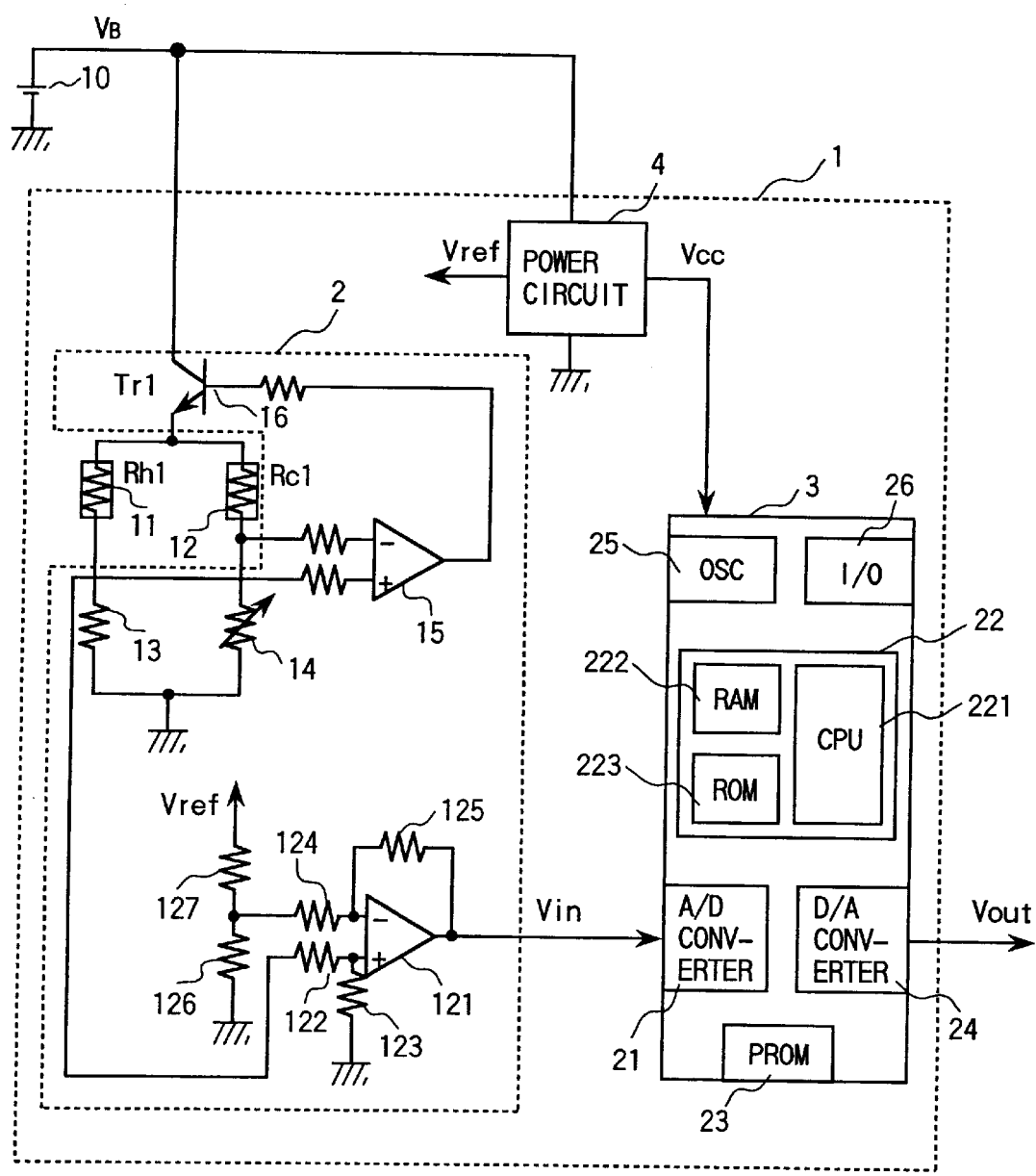
FIG. 4 is a circuit of a hard construction of the first embodiment of the present invention.

Next, a concrete hardware construction in one embodiment of the present invention will be explained, referring to FIG. 4.

The sensor circuit 2 is constructed so that the heat generating resistor 11 and the temperature compensating resistance 12 are connected to resistances 13, 14, respectively, to form a Wheatstone bridge circuit, and the current flowing in the heat generating resistor 11 is controlled by an operational amplifier 15 and a transistor 16 so that a voltage difference at the center of bridge becomes zero, whereby it is controlled so that a resistance value of the heat generating resistor 11 is always constant, that is, the temperature has a constant value, irrespective of flow rate of the air.

As a result, values of current flowing in the heat generating resistor 11 change according to flow rates of the air, so that voltage signals representative of the air flow rates are obtained by taking out the current values as voltage due to voltage drop of the resistance 13.

The voltage corresponding to the air flow rates, taken out from a connecting point of the heat generating resistor 11 and the resistance 13 are inputted to a zero span circuit composed of an operational amplifier 121 and resistances 122, 123, 124, 125, 125 and 127, and outputted from the operational amplifier 121 as output signals Vin which have been subjected to zero point adjustment and sensitivity adjustment.

Here, the heat generating resistor 11 is a resistor which is formed by winding a wire of resistance such as a platinum wire or a tungsten wire on a cylindrical or columnar bobbin made of an insulating material such as ceramics and coating it with a covering material such as glass or ceramics.

Further, what is made by forming a thin film or a thick film, of platinum or tungsten on a surface of a substrate of glass, ceramics or silicon can be used as the heat generating resistor 11.

The heat generating resistor 11 is provided in the intake air duct of an internal combustion engine for a vehicle, voltage corresponding to a flow rate of the air flowing in the intake air duct is detected and output signal Vin is obtained from the operational amplifier 121.

The output signal Vin is converted to a digital quantity by the A/D convertor 21 contained in the micro-processor 3, subjected to the air flow rate conversion processing 42 and error correction 44 as explained in FIG. 2, and to digital filter processing 46 and voltage output conversion processing 47 by a CPU 221 inside the micro-processor 3, and then converted to an analogue quantity by the D/A convertor 24 and outputted as an output signal Vout of non-linear characteristic.

Therefore, the micro-processor 3 is provided with a nonvolatile memory (ROM) 223 containing therein various kinds of flow rate maps and programs, programmable memory (PROM) 23 recording individuality difference information of variations, etc. in resistance, etc. of the heat generating resistor 11, a random access memory (RAM) 222 used for an arithmetic operation region of the CPU 221, an oscillator (OSC) 25 generating inside clock, etc., as shown in Figure.

Here, the PROM 23 can be a PROM not built in the micro-processor 3, and it can be a fuse type ROM, an electrically erasable EEPROM, a flash ROM which is all-at-once erasable, a high speed nonvolatile memory using a paralyzation phenomenon of a film of ferroelectric substance, etc. Any of the memories can be used.

According to the above-mentioned embodiment, there are advantages that the errors due to non-linearity can be reduced without losing such basic properties inherent to the heat generating type flow sensor as has a wide flow rate measuring range while maintaining a high resolution ability in a low flow rate region, and that it can be used under the same conditions as the case of a conventional sensor when it is applied to a system requiring flow rate measurement.

Further, according to the above-mentioned embodiment, it is made so as to execute smoothing processing after correction of various errors and, as a result, non-continuity of the characteristics due to effecting and not effecting of correction can be avoided and a dynamically stable flow rate meter can be provided.

In the above-mentioned embodiment, it is also possible to recover the responsivity of sensor with a voltage value before converting output signals Vin being supplied by the sensor circuit 2 to flow rates. In this case, it is possible to obtain more precise flow rate values.

Concretely, it is achieved by obtaining air flow rate waves through compensating the responsivity by numerical operation processing of the outputs obtained from the heat generating resistor 11 and having response delay. As a means for compensating the responsivity at this time, it is possible to use a circuit composed of an arithmetic operational amplifier, condenser and resistance, for example.

It is possible to compensate the responsivity by the numerical operation, by operation according to the following equation (2), for example:

$$Vc = 0.5 \times (Vn + V(n+1)) + (Kg \cdot f(v)) \cdot (Vn - V(n+1)) \qquad (2)$$

Here, Vn is current output voltage, V(n+1) is output voltage before a constant time, Kg is a constant of change part in voltage, f(v) is a function representing input dependency of output voltage and Vc is output voltage of which the responsivity is compensated.

By processing air flow rate conversion of the output voltage Vc, it is possible to obtain the output voltage the responsivity of which is compensated.

Further, at this time, if it is constructed so that different factor values are used as the factor Kg of change part according to whether the difference between the current output voltage and the output voltage before a prescribed constant time is minus or plus, the response delay can be compensated more effectively.

The heat generating resistance type air flow sensor is a sensor of the type in which a heat generating resistance is arranged in a bypass provided in the intake air duct. In this case, it is more effective to compensate the responsivity of the bypass at the same time as the above-mentioned compensation.

In this manner, in the case of judging a backward flow section from a pulsation wave, using the air flow rate signal the responsivity of which is compensated, the judgement becomes easy and it is possible to improve the precision of varied error correction.

Next, a second embodiment of the present invention will be described hereunder, referring to FIG. 5.

This embodiment is constructed so that when the embodiment is applied to an internal combustion engine for a vehicle, flow rate measurement characteristics are switched according to the properties of the internal combustion engine. Therefore, plural digital filters are provided, each of which is such a digital filter 46 that used in the arithmetic operation processing 40 as shown in FIG. 2 for smoothing in the first embodiment.

Figure 5:
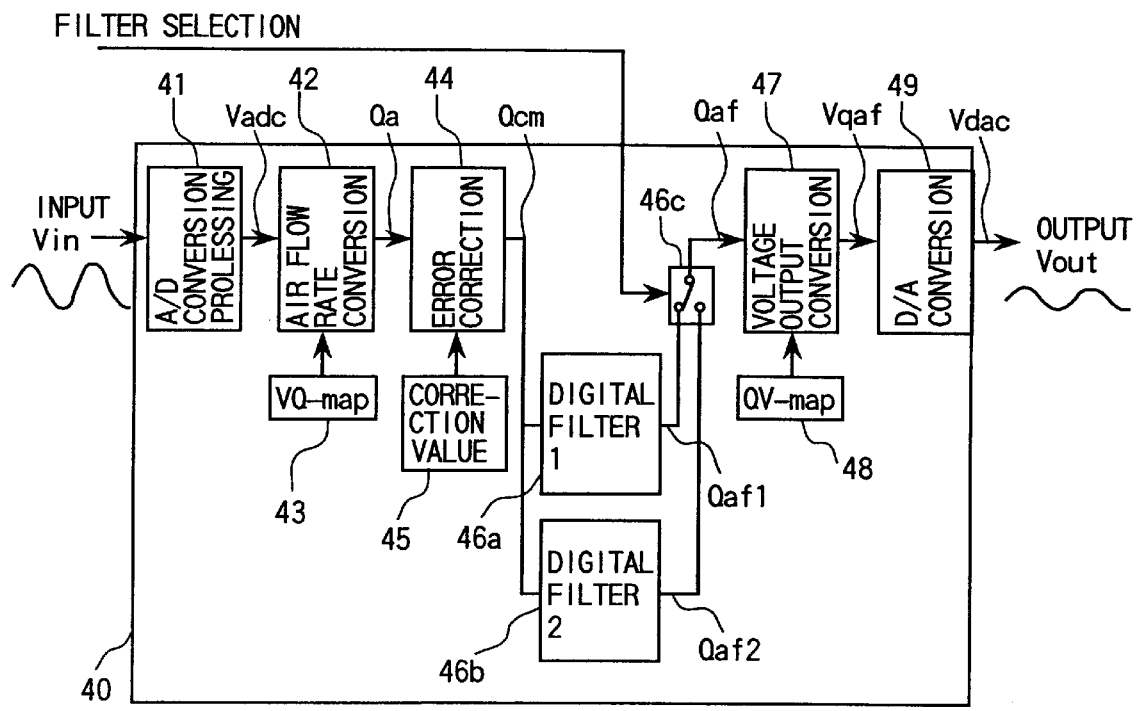
FIG. 5 is a block diagram for explanation of processing in a second embodiment of the present invention.

In FIG. 5, except for the provision of first digital filter processing and a second digital filter processing denoted by reference numbers 46a, 46b, respectively, and the selection of output therefrom by a software switch 46c, the other processing contents are the same as in FIG. 2.

The output signals Vin of the sensor circuit 2 are converted to digital values Vadc by the A/D converter 41, and subjected to the air flow rate conversion processing 42 and error correction processing 44 to from signals Qcm. One of the signals Qcm is inputted into the first digital filter processing 46a and another is inputted into the second digital filter processing 46b, and then they are individually subjected to the smoothing processing.

One of signals Qaf1 and Qaf2 that the signals have been smoothed by the first and second digital filter processing 46a and 46b, respectively, is selected by the software switch 46c controlled with filter selection signals supplied from outside. The selected signal is subjected to voltage output conversion processing 47, returned to an analogue value by the D/A conversion processing 49 and then outputted as a non-linearity voltage output signal Vout equivalent to the output signal Vin of the sensor circuit 2.

Therefore, according to this embodiment, it is possible to accord with optimum characteristics even for an internal combustion engine with different intake air pulsation characteristics by selecting digital filter processing 46a or 46b according to the internal combustion engine to be applied, and to reduce sufficiently error due to non-linearity of the sensor output.

Next, a concrete construction example of the digital filter processing 46a, 46b will be explained, referring to FIG. 6.

First of all, the first digital filter processing 46a is constructed so as to obtain a filter function by averaging signals for a certain constant time, that is, constructed so as to output by delaying, adding input signals every sampling and multiplying a constant gain.

Therefore, the first digital filter processing 46a is shown as the following equation (3):

$$Yn = (Xn + X(n-1) + X(n-2) + \cdots + X(n-m))K1 \qquad (3)$$

where, Xn is an input signal, X(n−1) is an input signal before one sampling, and X(n−m) is an input signal before m sampling. When the gain constant K1 is set 1/(m+1), an average value Yn of input signals Qcm of m samples can be obtained.

This type of filter can obtain stably an average value but, however, has a property making a filter effect large which increases a delay quantity.

Therefore, the first digital filter processing 46a is suitable for an internal combustion engine relatively small in intake pulsation amplitude by making a filter effect small, that is, making a delay quantity small, whereby it can be done at a small calculation load, so that it is effective for reduction of error.

Figure 6:
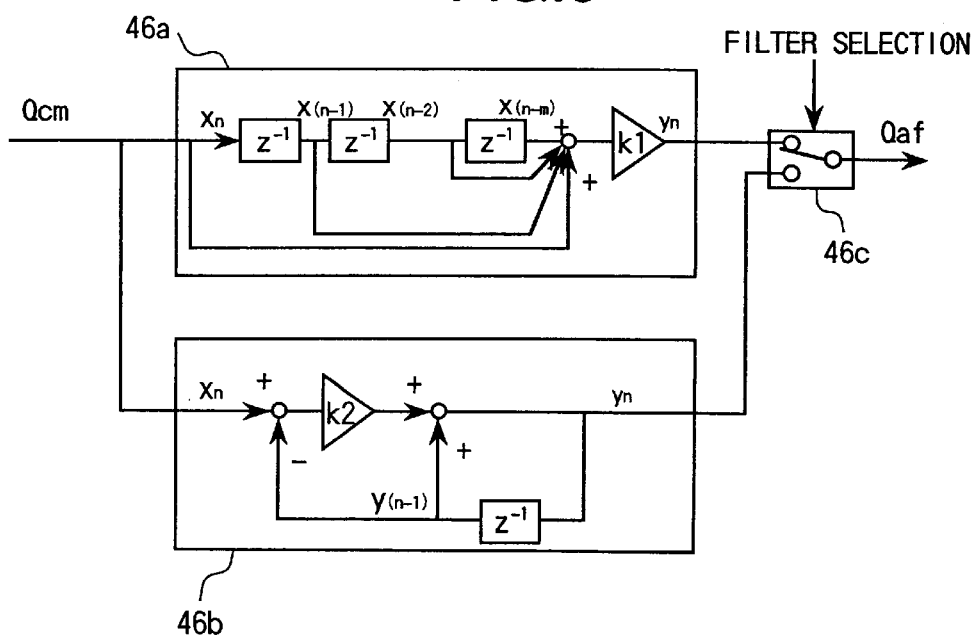
FIG. 6 is a block diagram for an operation principle of a digital filter in the second embodiment of the present invention.

On the other hand, the second digital filter processing 46b is composed of a filter using a differential equation, and constructed so that an average value Yn of the input signals Qcm of m samples is obtained by obtaining a difference between the input signal and the output signal once before and weighing it, as shown in FIG. 6.

Therefore, the second digital filter processing 46b becomes as shown by the following equation (4):

$$Yn = Y(n-1) + (Xn - Y(n-1)) \times K2 \qquad (4)$$

where Xn is an input signal and Y(n−1) is an output signal before one sampling. A gain K2 is set to 1 or less, and it is possible to change a smoothing effect to sampling frequencies by changing this gain K2.

The second digital filter processing 46b is effective in a case where it is applied to an internal combustion engine relatively large in intake air pulsation amplitude, and it is possible to obtain a large effect of reduction of the amplitude at a small calculation load.

Therefore, according to the second embodiment, it is easy to optimize for an internal combustion engine having a different intake air pulsation characteristic, and it is possible to sufficiently reduce an error due to non-linear of sensor output by an arithmetic operation at a small calculation load.

The second embodiment is an example of the case where a primary digital filter is used and, as a result, it has an advantage that it can be done at a minimum calculation load. However, it is possible to use a high-order filter of a secondary filter or higher in order to obtain a larger smoothing effect.

Further, for the digital filter processing which is not selected, it is possible to stop the arithmetic operation.

Figure 7:
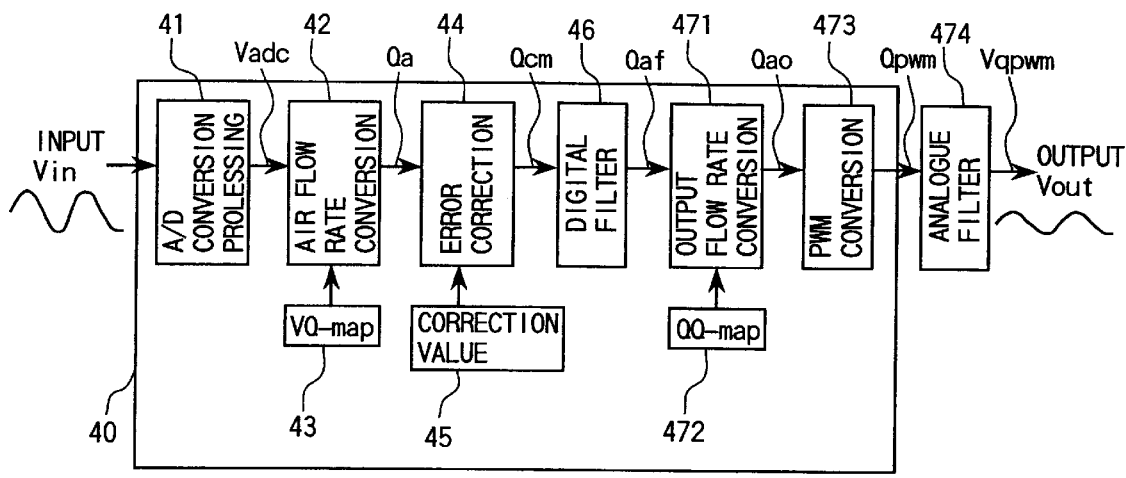
FIG. 7 is a block diagram for explanation of processing in a third embodiment of an air flow measuring apparatus according to the present invention.

Next, a third embodiment of the present invention will be described, referring to FIG. 7.

The third embodiment is provided with output flow rate conversion processing 471 instead of the voltage output conversion processing 47, and PWM conversion processing 473 instead of the D/A conversion processing 49 in the arithmetic operation processing of the first embodiment, and is constructed so that further smoothing can be obtained by adding an analogue filter 474 of a hardware construction.

In the arithmetic operation processing 40 according to the third embodiment, the processing until amplitude reduction processing of a flow rate value is effected by the digital filter processing 46 to obtain signal Qaf after analogue digital conversion processing 41 is effected for the output signal Vin supplied from the sensor circuit 2 is the same as in the first embodiment shown in FIG. 2.

The smoothed signal Qaf obtained in the above-mentioned manner, first of all, is converted to linear flow rate value Qao having an offset by the output flow rate conversion processing 471 using a QQ-map 472 formed on the rewriting memory 23. Here, the QQ-map is a flow rate-flow rate conversion map, and in this embodiment, this is the second conversion equation.

Next, the linear flow rate value Qao having an offset is converted to the pulse output that digital value is modulated with pulse width (pulse width modulation), that is, to PWM conversion output Qpwm by the PWM conversion processing 473, and the output is smoothed by the analogue filter 474 to obtain analogue output Vqpwm and the output Vqpwm is outputted as output signal Vout.

According to this third embodiment, since the flow rate value is smoothed by both the digital filter processing 46 and analogue filter 474, it is possible to reduce non-continuity of a pulsation wave due to the error correction and a pulsation amplitude.

Further, in this embodiment, since the analogue filter 474 is used in addition to the digital filter processing 46, an effect that is characteristic of the digital filter processing becomes mild.

Figure 8:
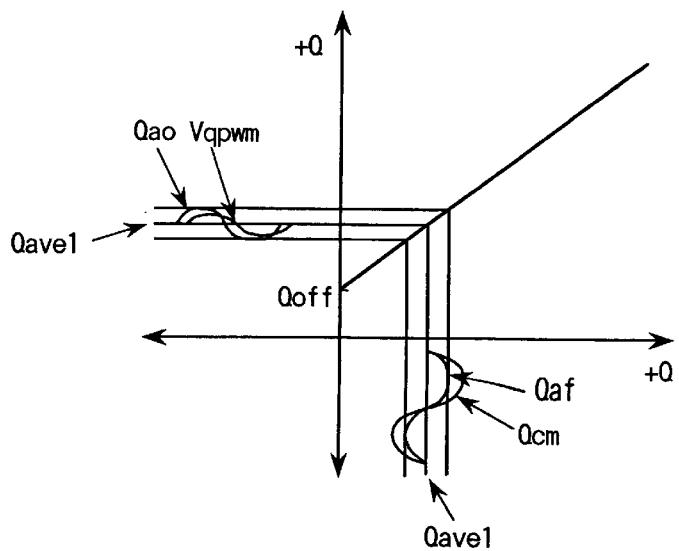
FIG. 8 is a characteristic diagram for explanation of an operation principle of a conversion map in the third embodiment of the present invention.

Next, characteristics due to use of the processing by the flow rate-flow rate map as the second conversion equation in the third embodiment are explained, referring to FIG. 8.

A feature of the embodiment is in that interface is taken as a voltage signal that an offset Qoff of flow rate is set the sensor output, taking noises, etc. of devices and apparatus into consideration when the output signal Vout is sent to the engine control unit 5, and advantageous in S/N.

Considering a flow rate Qcm shown in FIG. 8 as a flow rate showing an ideal sine wave at a time of pulsation in air flow rate after voltage is converted to flow rate by the map due to the first conversion in the air flow rate conversion processing 42, the signal Qaf that the amplitude of the flow rate value is converted by the digital filter processing 46 changes in gain of flow rate by an offset Qoff given to the flow rate to be turned into a new flow rate Qao.

By filter processing of the flow rate, the amplitude is reduced and finally a signal Vqpwm is obtained. However, at this time, since an average value Qavel of the flow rate does not change, reduction of the amplitude can be obtained without generating non-linearity error and, therefore, it becomes advantageous in S/N.

Figure 9:
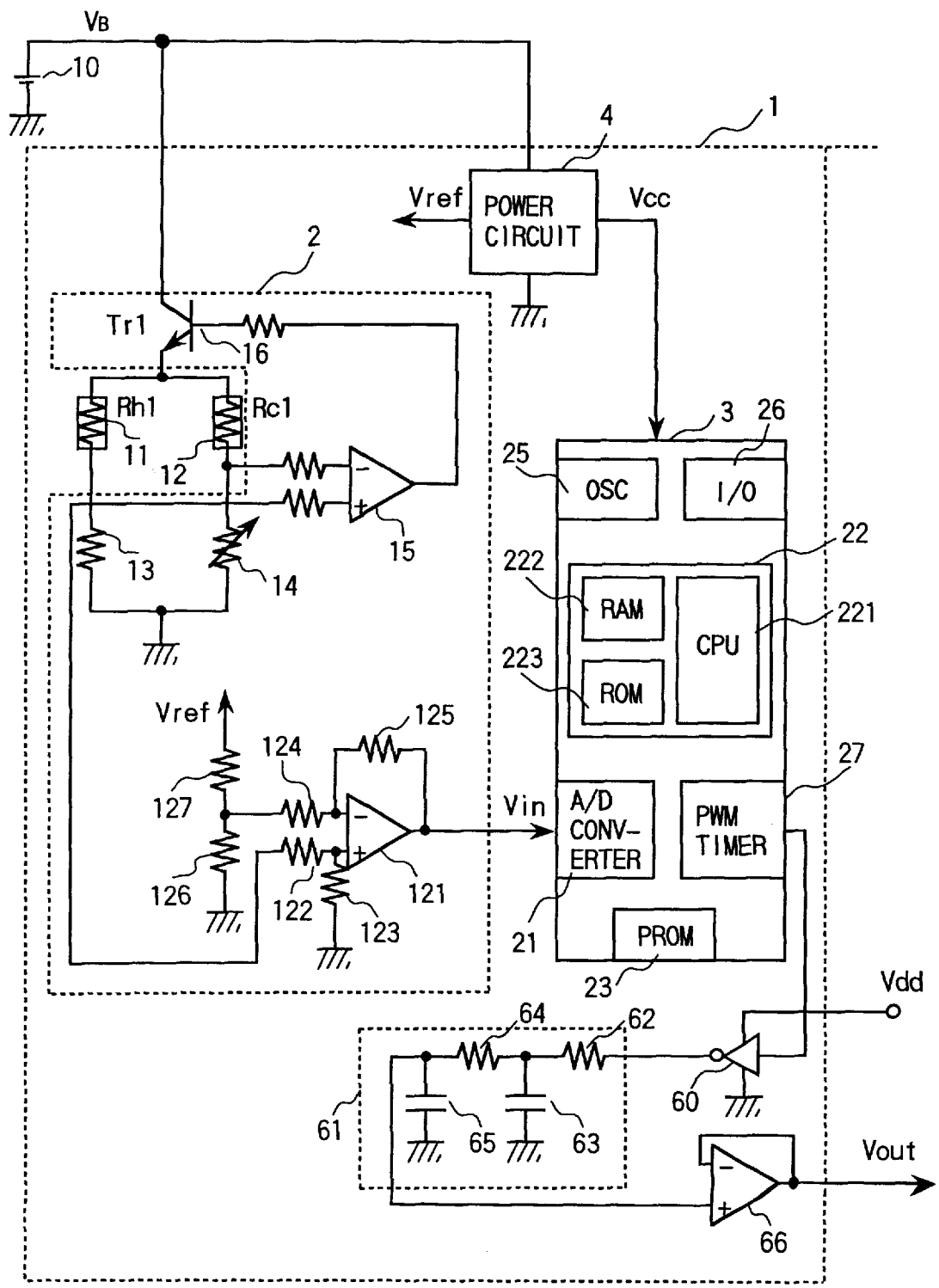
FIG. 9 is a circuit of a hard construction of the third embodiment of the present invention.

Next, a concrete hardware construction according to this embodiment is explained, referring to FIG. 9.

In FIG. 9, a part corresponding to the PWM conversion processing 473 shown in FIG. 8 is a PWM timer 27, a part corresponding to the analogue filter 474 is a smoothing circuit 61 and the other constructions are constructed so that the output flow rate conversion processing 471 is executed instead of the voltage output conversion processing 47 among the processing by the CPU 221 of the micro-processor 3. Therefore, the only difference is that the second arithmetic operation equation formed as a map on the PROM 23 becomes the QQ-map 472, and the other constructions are the same as the embodiment in FIG. 4.

The PWM timer 27 inputs the flow rate signal Qao subjected to the output flow rate conversion processing 471 and converts it to pulse having pulse width corresponding to the voltage value of the flow rate signal to output.

The pulse width signal outputted from the PWM timer is inputted into an inverter 60 operated with voltage Vdd given by an outside power source to thereby output a pulse having a width of voltage Vdd. The pulse is inputted into a smoothing circuit 61 composed of resistances 62 and 63 and condensers 63 and 65, converted to a signal of analogue value through smoothing, taken out as an output signal Vout of linear voltage value type through a buffer amplifier 66 and then supplied to the engine control unit 5 or the like.

According to this embodiment, since the PWM pulse, the amplitude of which is defined by the voltage Vdd of the outside power source, is used, it has an advantage in that it is possible to directly get the output signal Vout having ratio metric characteristics.

Further, according to this embodiment, since it is constructed so that analogue signal is outputted using the PWM timer 27 and the smoothing circuit 61, a D/A convertor becomes unnecessary and an tip area of the micro-processor 3 can be made small, whereby a cost can be reduced.

According to the embodiment, error due to nonlinearity can be surely reduced without basic properties inherent in the heat generating resistance type flow sensor, so that it can reduce frequencies that sampling time is limited when it is applied for intake air flow rate measurement of an internal combustion engine.

Further, according to the embodiment, since the smoothing processing is executed after various error correction processing, it is possible to avoid non-continuity of the characteristic caused by effecting correction or no correction and provide a dynamically stable sensor system.

Further, according to the embodiment, it is possible to easily effect accord of characteristics for an internal combustion engine different in intake air pulsation characteristic by arithmetic operation at a small calculation load, sufficiently reduce error due to non-linearity of a sensor output.

What is claimed is:

1. An air flow measuring apparatus for metering an air flow rate in an air flow passage, comprising:
   a heat generating resistor arranged in the air flow passage;
   a sensor circuit including said heat generating resistor and processing an electric value detected through said heat generating resistor to output a voltage value;
   a first converter electrically connected to said sensor circuit for converting a first voltage value output from said sensor circuit into an air flow value, based on a first preset relation of voltage value and air flow rate;
   a filter electrically connected to said first converter for smoothing output of said first converter; and
   a second converter electrically connected to said filter for converting output of said filter to a second voltage value, based on a second preset relation of voltage value and flow rate;
   wherein the output of said second converter is taken out as a flow rate detection signal.

2. An air flow measuring apparatus according to claim 1, and further comprising means provided between said first converter and said filter for correcting a characteristic error generated in the first voltage value.

3. An air flow measuring apparatus according to claim 1, wherein said second preset relation is an inverse function of said first preset relation.

4. An air flow measuring apparatus according to claim 1, and further comprising means provided before said first converter for reducing response delay in flow rate change of said heat generating resistor.

5. An air flow measuring apparatus according to claim 1, wherein said filter includes a plurality of filters, and wherein one of said plurality of filters is selected according to an object in which a flow rate is to be measured.

6. An air flow measuring apparatus according to claim 1, and further comprising a further filter provided after said second converter, wherein a time constant of said further filter is larger than that of said filter.

7. An air flow measuring apparatus according to claim 2, wherein said second preset relation is an inverse function of said first preset relation.

8. An air flow measuring apparatus according to claim 2, and further comprising means provided before said first converter for reducing response delay in flow rate change of said heat generating resistor.

9. An air flow measuring apparatus according to claim 2, wherein said filter includes a plurality of filters, and wherein one of said plurality of filters is selected according to an object in which a flow rate is to be measured.

10. An air flow measuring apparatus according to claim 2, and further comprising a further filter provided after said second converter, wherein a time constant of said further filter is larger than that of said filter.

11. An air flow measuring apparatus according to claim 3, wherein said filter includes a plurality of filters, and wherein one of said plurality of filters is selected according to an object in which a flow rate is to be measured.

12. An air flow measuring apparatus according to claim 7, wherein said filter includes a plurality of filters, and wherein one of said plurality of filters is selected according to an object in which a flow rate is to be measured.

13. An air flow measuring apparatus according to claim 1, wherein said first preset relation is a relation between voltage value and air flow rate according to King's equation and said first second preset relation is an inverse function of said first preset relation.

14. A process for metering an air flow rate in an air flow passage, using a heat generating resistor arranged in the air flow passage, comprising the steps of:
   processing an electric value sensed by said heat generating resistor to output a first voltage value;
   converting the first voltage value into an air flow value, based on a first preset relation of voltage value and air flow rate;
   smoothing an air flow rate of output of said first converter; and
   converting the smoothed output to a second voltage value, based on a second preset relation of voltage values and air flow rates so as to define a flow rate detection signal.

15. The process according to claim 14, and further comprising the step of correcting a characteristic error generated in the first voltage value.

16. The process according to claim 14, wherein said step of providing second preset relation is an inverse function of said first preset relation.

17. The process according to claim 14, and further comprising the step of reducing response delay in flow rate change of said heat generating resistor before converting the first voltage value.

18. The process according to claim 14, wherein said step of smoothing an air flow rate of output includes selecting one of a plurality of filters according to an object in which a flow rate is to be measured.

19. The process according to claim 14, wherein the step of converting the smoothed output includes converting the smoothed output to a linear value, pulse width modulating the linear value, and smoothing the pulse width modulated value.

20. The process according to claim 15, wherein said step of providing second preset relation is an inverse function of said first preset relation.

21. The process according to claim 15, and further comprising the step of reducing response delay in flow rate change of said heat generating resistor before converting the first voltage value.

22. A process according to claim 14, wherein said step of providing first preset relation is a relation between voltage value and air flow rate according to King's equation and said second preset relation is an inverse function of said first preset relation.

* * * * *